(12) United States Patent
Richter et al.

(10) Patent No.: US 12,148,090 B2
(45) Date of Patent: *Nov. 19, 2024

(54) METHOD AND DEVICE FOR VISUALIZING SENSORY PERCEPTION

(71) Applicant: Apple Inc., Cupertino, CA (US)

(72) Inventors: Ian M. Richter, Los Angeles, CA (US); John Joon Park, Chino, CA (US); David Michael Hobbins, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/233,873

(22) Filed: Aug. 14, 2023

(65) Prior Publication Data

US 2023/0401783 A1 Dec. 14, 2023

Related U.S. Application Data

(63) Continuation of application No. 17/184,926, filed on Feb. 25, 2021, now Pat. No. 11,763,517.

(60) Provisional application No. 62/982,263, filed on Feb. 27, 2020.

(51) Int. Cl.
| | |
|---|---|
| *G06T 15/20* | (2011.01) |
| *G06F 3/01* | (2006.01) |
| *G06T 19/20* | (2011.01) |

(52) U.S. Cl.
CPC ............ *G06T 15/20* (2013.01); *G06F 3/012* (2013.01); *G06F 3/013* (2013.01); *G06T 19/20* (2013.01); *G06T 2200/24* (2013.01); *G06T 2219/024* (2013.01); *G06T 2219/2004* (2013.01)

(58) Field of Classification Search
CPC ..... G06T 15/20; G06T 19/20; G06T 2200/24; G06T 2219/024; G06T 2219/2004; G06F 3/012; G06F 3/013; G06F 3/011
See application file for complete search history.

(56) References Cited

U.S. PATENT DOCUMENTS

| | | | |
|---|---|---|---|
| 6,507,802 | B1 | 1/2003 | Payton et al. |
| 11,763,517 | B1* | 9/2023 | Richter ............... G06T 19/20 345/419 |
| 2011/0187716 | A1 | 8/2011 | Chen et al. |
| 2012/0105446 | A1 | 5/2012 | Cao et al. |
| 2015/0287158 | A1 | 10/2015 | Cerny et al. |
| 2018/0015362 | A1* | 1/2018 | Terahata ............... A63F 13/215 |
| 2018/0295240 | A1 | 10/2018 | Dickins et al. |
| 2019/0197785 | A1 | 6/2019 | Tate-Gans et al. |
| 2019/0206118 | A1 | 7/2019 | Radel et al. |

* cited by examiner

*Primary Examiner* — Chong Wu
(74) *Attorney, Agent, or Firm* — Fernando & Partners, LLP

(57) ABSTRACT

In some implementations, a method of generating a third person view of a computer-generated reality (CGR) environment is performed at a device including non-transitory memory and one or more processors coupled with the non-transitory memory. The method includes: obtaining a first viewing vector associated with a first user within a CGR environment; determining a first viewing frustum for the first user within the CGR environment based on the first viewing vector associated with the first user and one or more depth attributes; generating a representation of the first viewing frustum; and displaying, via the display device, a third person view of the CGR environment including an avatar of the first user and the representation of the first viewing frustum adjacent to the avatar of the first user.

20 Claims, 14 Drawing Sheets

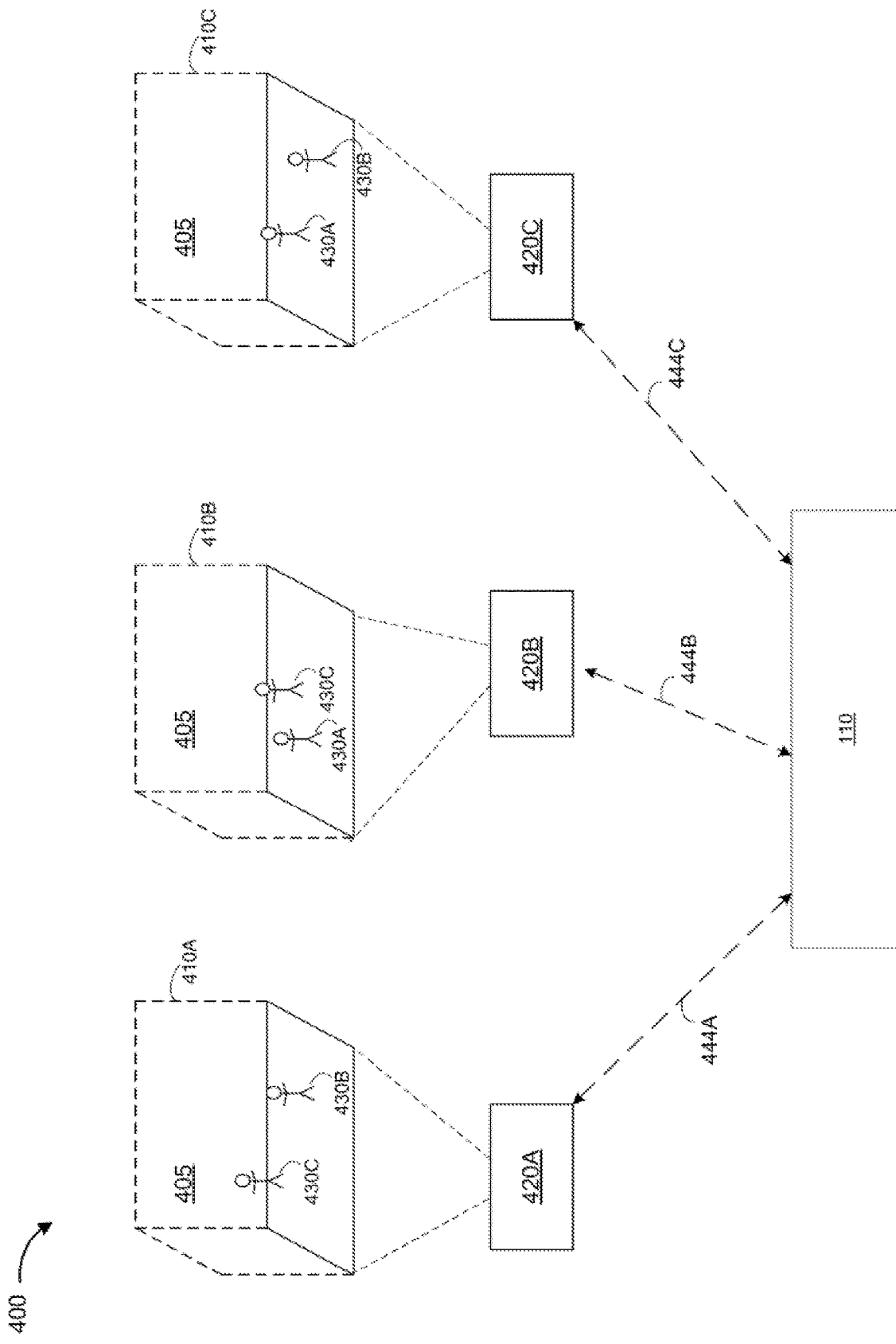

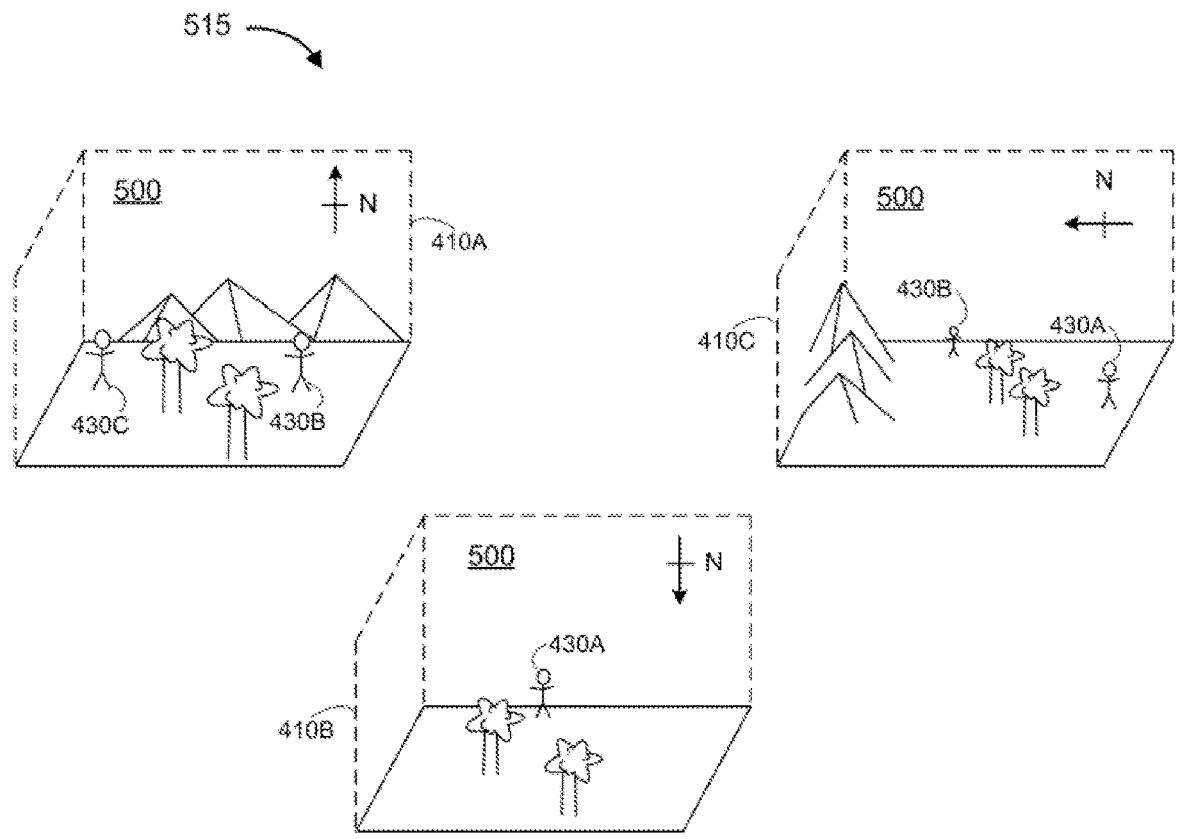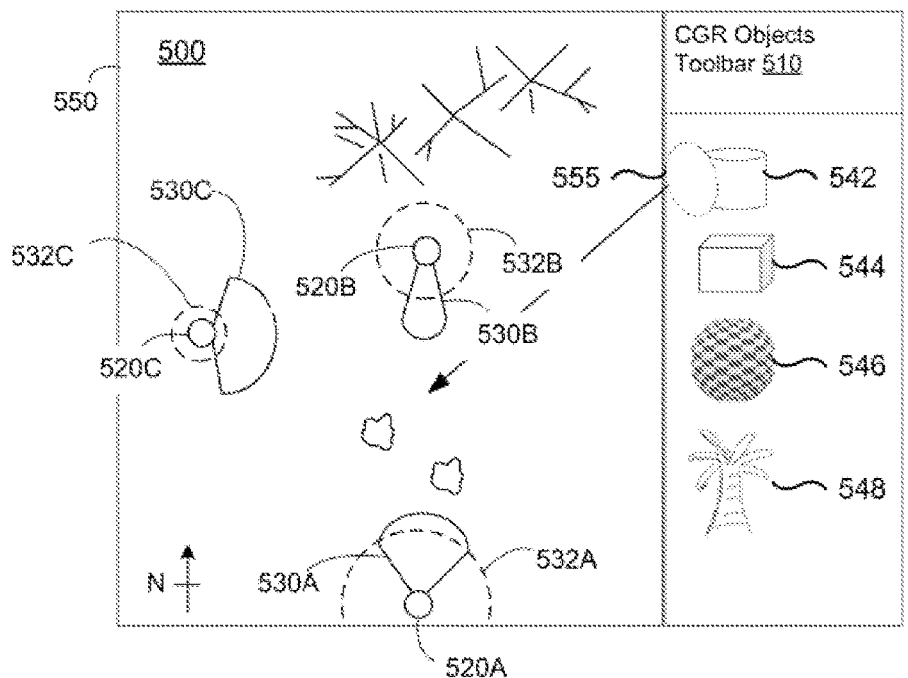
Figure 5B

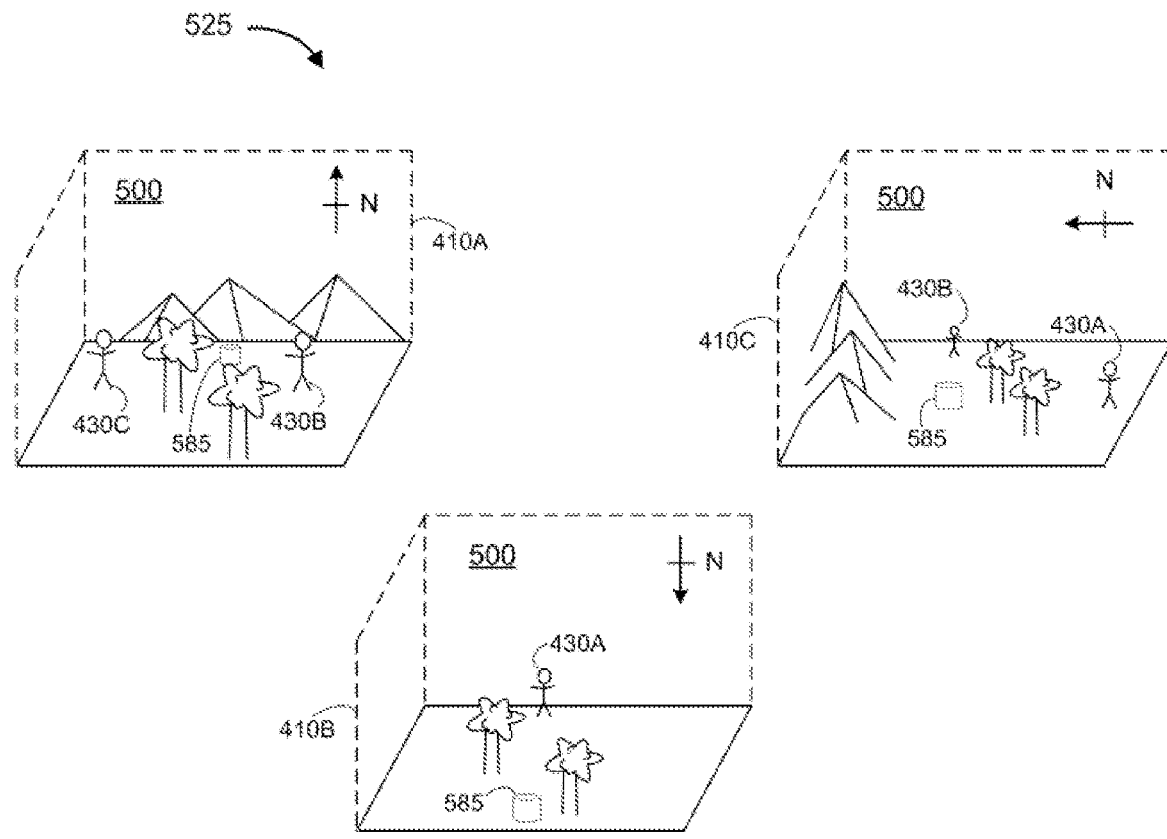
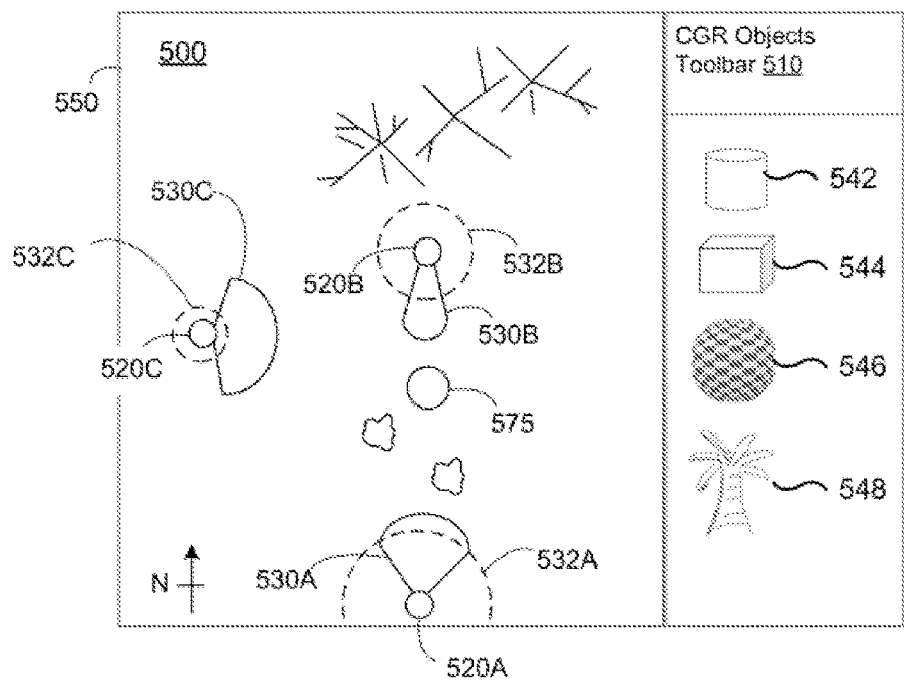
Figure 5C

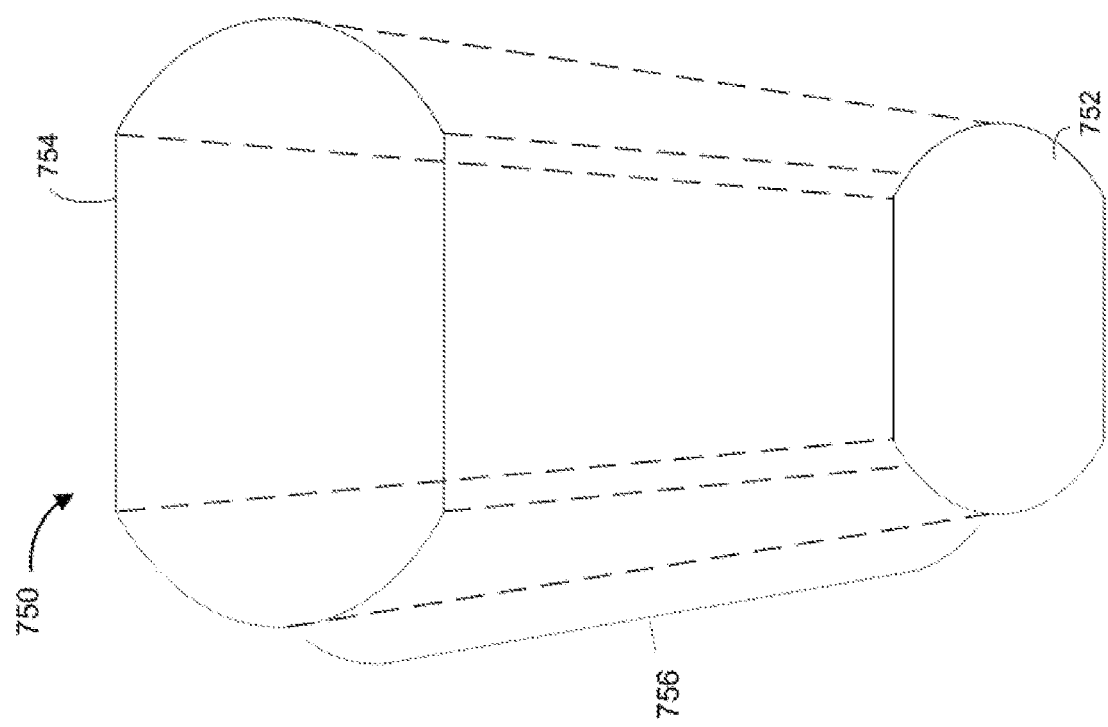
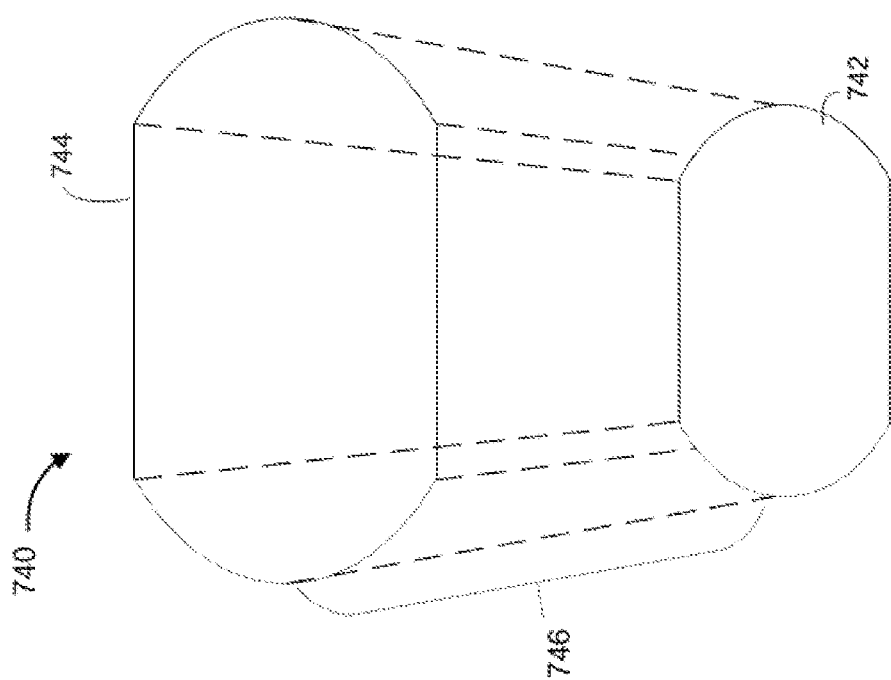
Figure 7B

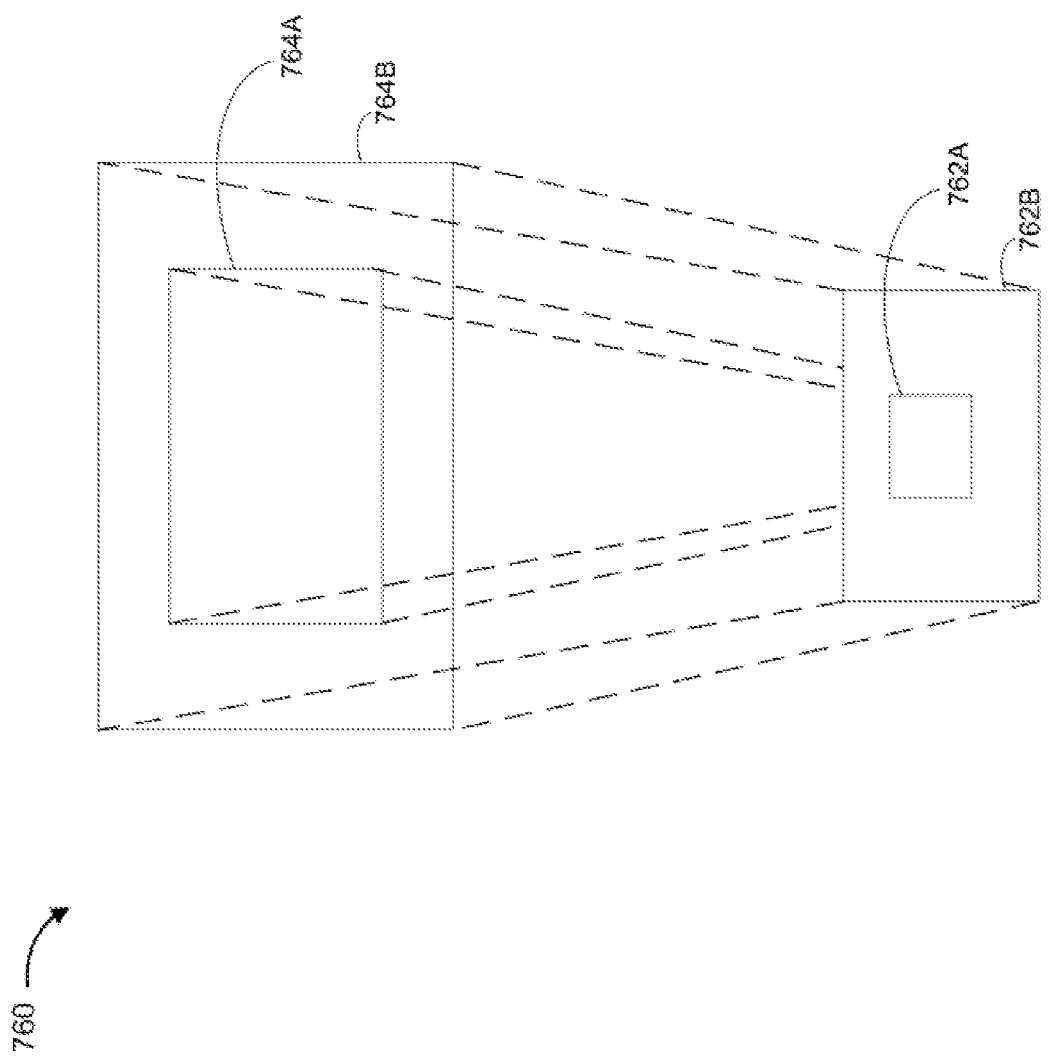

METHOD AND DEVICE FOR VISUALIZING SENSORY PERCEPTION

CROSS-REFERENCE TO RELATED APPLICATIONS

This application claims the benefit of U.S. Provisional Patent App. No. 62/982,263, filed on Feb. 27, 2020 and is a continuation of U.S. Non-Provisional patent application Ser. No. 17/184,926, filed on Feb. 25, 2021, which are incorporated by reference in their entireties.

TECHNICAL FIELD

The present disclosure generally relates to visualizing sensory perception, and in particular, to systems, methods, and devices for generating a third person view of a computer-generated reality (CGR) environment that shows the sensory perception of users therein.

BACKGROUND

In some instances, an orchestrator (e.g., a puppet-master or third-party manager) of a computer-generated reality (CGR) environment, including a plurality of users, may wish to place a CGR object into the field-of-view (FOV) of a subset of the plurality of third users. However, the orchestrator, with a third person view (e.g., plan view, top-down view, or the like) of the CGR environment, may not know the bounds of a user's viewing frustum (or cone of vision) in order to place the CGR object into that user's FOV. As such, according to some implementations, the method described herein determines a viewing frustum for each of the plurality of users within the CGR environment and displays representations thereof to the orchestrator.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a block diagram of an example multi-user computer-generated reality (CGR) experience in accordance with some implementations.

FIGS. 5A-5C illustrate a sequence of instances for a multi-user CGR experience in accordance with some implementations.

FIG. 7B illustrates first and second viewing frustums in accordance with some implementations.

FIG. 7C illustrates an example foveated viewing frustum in accordance with some implementations.

Figure 1:
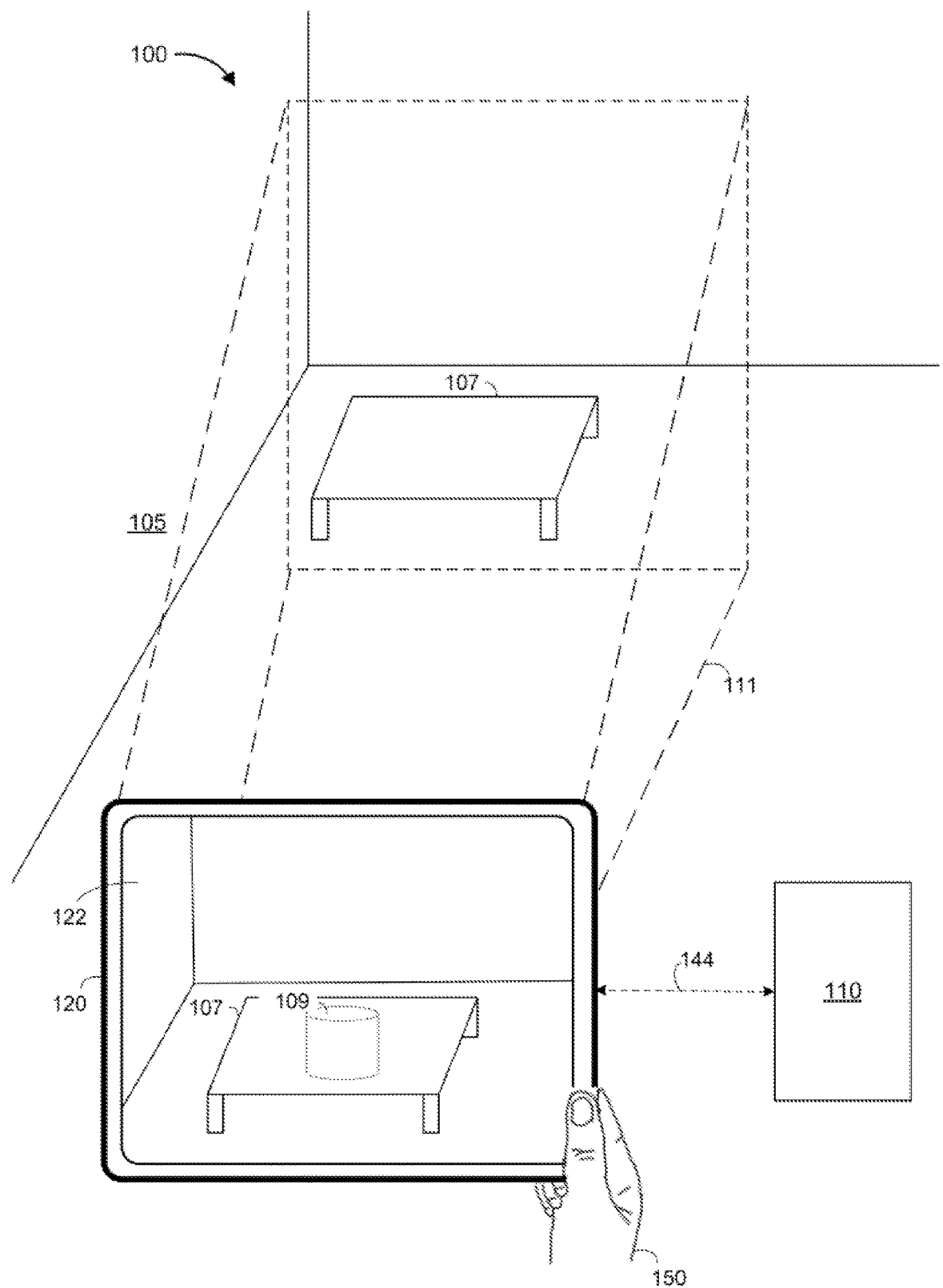
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating and displaying a third person view of a computer-generated reality (CGR) environment. According to some implementations, the method is performed at a device including one or more processors, non-transitory memory, and a display device. The method includes: obtaining a first viewing vector associated with a first user within a computer-generated reality (CGR) environment; determining a first viewing frustum for the first user within the CGR environment based on the first viewing vector associated with the first user and one or more depth attributes; generating a representation of the first viewing frustum; and displaying, via the display device, a third person view of the CGR environment including an avatar of the first user and the representation of the first viewing frustum adjacent to the avatar of the first user.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, a computer-generated reality (CGR) environment refers to a wholly or partially simulated environment that people sense and/or interact with via an electronic device. For example, the CGR environment may include augmented reality (AR) content, mixed reality (MR) content, virtual reality (VR) content, and/or the like. With an CGR system, a subset of a person's physical motions, or representations thereof, are tracked, and, in response, one or more characteristics of one or more virtual objects simulated in the CGR environment are adjusted in a manner that comports with at least one law of physics. As one example, the CGR system may detect head movement and, in response, adjust graphical content and an acoustic field presented to the person in a manner similar to how such views and sounds would change in a physical environment. As another example, the CGR system may detect movement of the electronic device presenting the CGR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the CGR system may adjust characteristic(s) of graphical content in the CGR environment in response to representations of physical motions (e.g., vocal commands).

There are many different types of electronic systems that enable a person to sense and/or interact with various CGR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate a CGR experience for a user 150 (sometimes also referred to herein as a "CGR environment") and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents a computer-generated reality (CGR) experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the CGR experience, the electronic device 120 is configured to present CGR content (e.g., a CGR cylinder 109) and to enable video pass-through of the physical environment 105 (e.g., including the table 107) on a display 122. For example, the electronic device 120 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the CGR content (e.g., the CGR cylinder 109) onto the additive display, which is, in turn, overlaid on the physical environment 105 from the perspective of the user 150. In some implementations, the electronic device 120 presents the user interface by displaying the CGR content (e.g., the CGR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the CGR content (e.g., a single display or one for each eye). For example, the electronic device 120 encloses the field-of-view of the user 150. In such implementations, the electronic device 120 presents the CGR environment by displaying data corresponding to the CGR environment on the one or more displays or by projecting data corresponding to the CGR environment onto the retinas of the user 150.

In some implementations, the electronic device 120 includes an integrated display (e.g., a built-in display) that displays the CGR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR environment. In some implementations, the electronic device 120 is replaced with a CGR chamber, enclosure, or room configured to present CGR content in which the user 150 does not wear the electronic device 120.

In some implementations, the controller 110 and/or the electronic device 120 cause a CGR representation of the user 150 to move within the CGR environment based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
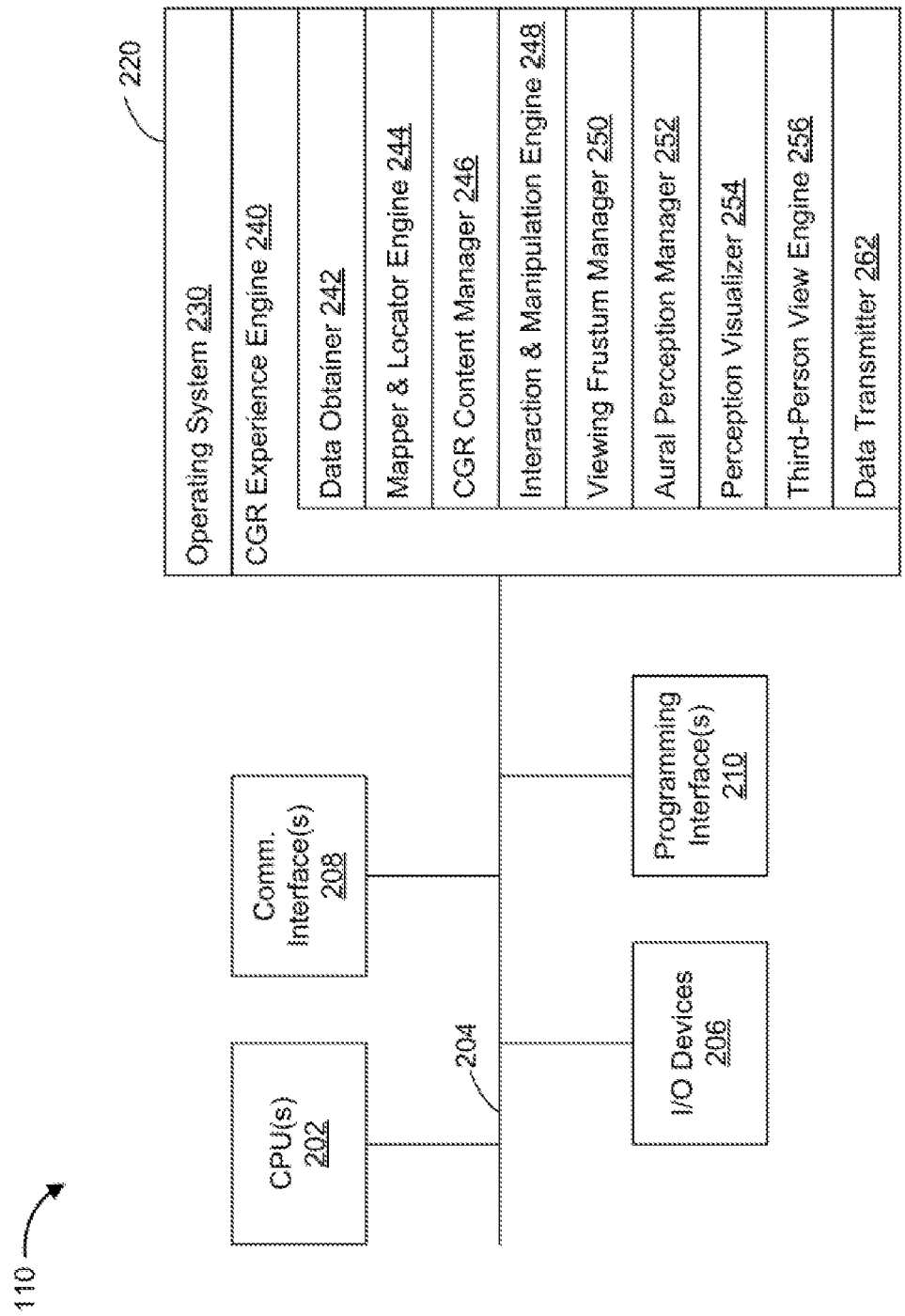
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a computer-generated reality (CGR) experience engine 240.

The operating system 230 includes procedures for handling various basic system services and for performing hardware dependent tasks.

In some implementations, the CGR experience engine 240 is configured to manage and coordinate one or more CGR experiences (sometimes also referred to herein as "CGR environments") for one or more users (e.g., a CGR experience for a single user, a CGR experience for a plurality of users (sometimes referred to herein as a "multi-user CGR experience"), or multiple CGR experiences for respective groups of one or more users). To that end, in various implementations, the CGR experience engine 240 includes a data obtainer 242, a mapper and locator engine 244, a CGR content manager 246, an interaction and manipulation engine 248, a viewing frustum manager 250, an aural perception manager 252, a perception visualizer 254, a third person view engine 256, and a data transmitter 262.

In some implementations, the data obtainer 242 is configured to obtain data (e.g., presentation data, input data, user interaction data, head tracking information, camera pose tracking information, eye tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the CGR content manager 246 is configured to generate (i.e., render), manage, and modify a CGR environment presented to a user. To that end, in various implementations, the CGR content manager 246 includes instructions and/or logic therefor, and heuristics and metadata therefor.

In some implementations, the interaction and manipulation engine 248 is configured to interpret user interactions and/or modification inputs directed to the CGR environment and CGR objects therein. To that end, in various implementations, the interaction and manipulation engine 248 includes instructions and/or logic therefor, and heuristics and metadata therefor.

In some implementations, the viewing frustum manager 250 is configured to obtain (e.g., receive, retrieve, or generate) a viewing vector and depth attributes for a user within a CGR environment. In some implementations, the viewing frustum manager 250 is also configured to determine a viewing frustum for the user based on the viewing vector associated with the user and one or more depth attributes. According to some implementations, the viewing frustum manager 250 is configured to determine viewing frustums for each of a plurality of users within a multi-user CGR experience. To that end, in various implementations, the viewing frustum manager 250 includes instructions and/or logic therefor, and heuristics and metadata therefor.

In some implementations, the aural perception manager 252 is configured to obtain (e.g., receive, retrieve, or generate) an aural characterization vector for a user within a CGR environment. In some implementations, the aural perception manager 252 is also configured to determine an aural perception region for the user based on the aural characterization vector associated with the user. According to some implementations, the aural perception manager 252 is configured to determine aural perception regions for each of a plurality of users within a multi-user CGR experience. One of ordinary skill in the art will appreciate that this concept may be extended to other sensory modalities such as determining an olfactory perception region for the user of the like. To that end, in various implementations, the aural perception manager 252 includes instructions and/or logic therefor, and heuristics and metadata therefor.

In some implementations, the perception visualizer 254 is configured to generate a representation of the viewing frustum associated with a user. In some implementations, the perception visualizer 254 is also configured to generate a representation of the aural perception region associated with the user. To that end, in various implementations, the perception visualizer 254 includes instructions and/or logic therefor, and heuristics and metadata therefor.

In some implementations, the third person view engine 256 is configured to generate a third person view of the CGR environment that includes an avatar for the user, the representation of the viewing frustum adjacent to the avatar of the user, and optionally the representation of the aural perception region adjacent to the avatar of the user. In some implementations, the third person view engine 256 is also configured to present the third person view of the CGR environment to an orchestrator (e.g., a puppet-master or third-party manager) of a CGR environment or a multi-user CGR experience. To that end, in various implementations, the third person view engine 256 includes instructions and/or logic therefor, and heuristics and metadata therefor.

In some implementations, the data transmitter 262 is configured to transmit data (e.g., presentation data such as rendered image frames associated with the CGR environment, location data, etc.) to at least the electronic device 120. To that end, in various implementations, the data transmitter 262 includes instructions and/or logic therefor, and heuristics and metadata therefor.

Although the data obtainer 242, the mapper and locator engine 244, the CGR content manager 246, the interaction and manipulation engine 248, the viewing frustum manager 250, the aural perception manager 252, the perception visualizer 254, the third person view engine 256, and the data transmitter 262 are shown as residing on a single device (e.g., the controller 110), it should be understood that in other implementations, any combination of the data obtainer 242, the mapper and locator engine 244, the CGR content manager 246, the interaction and manipulation engine 248, the viewing frustum manager 250, the aural perception manager 252, the perception visualizer 254, the third person view engine 256, and the data transmitter 262 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
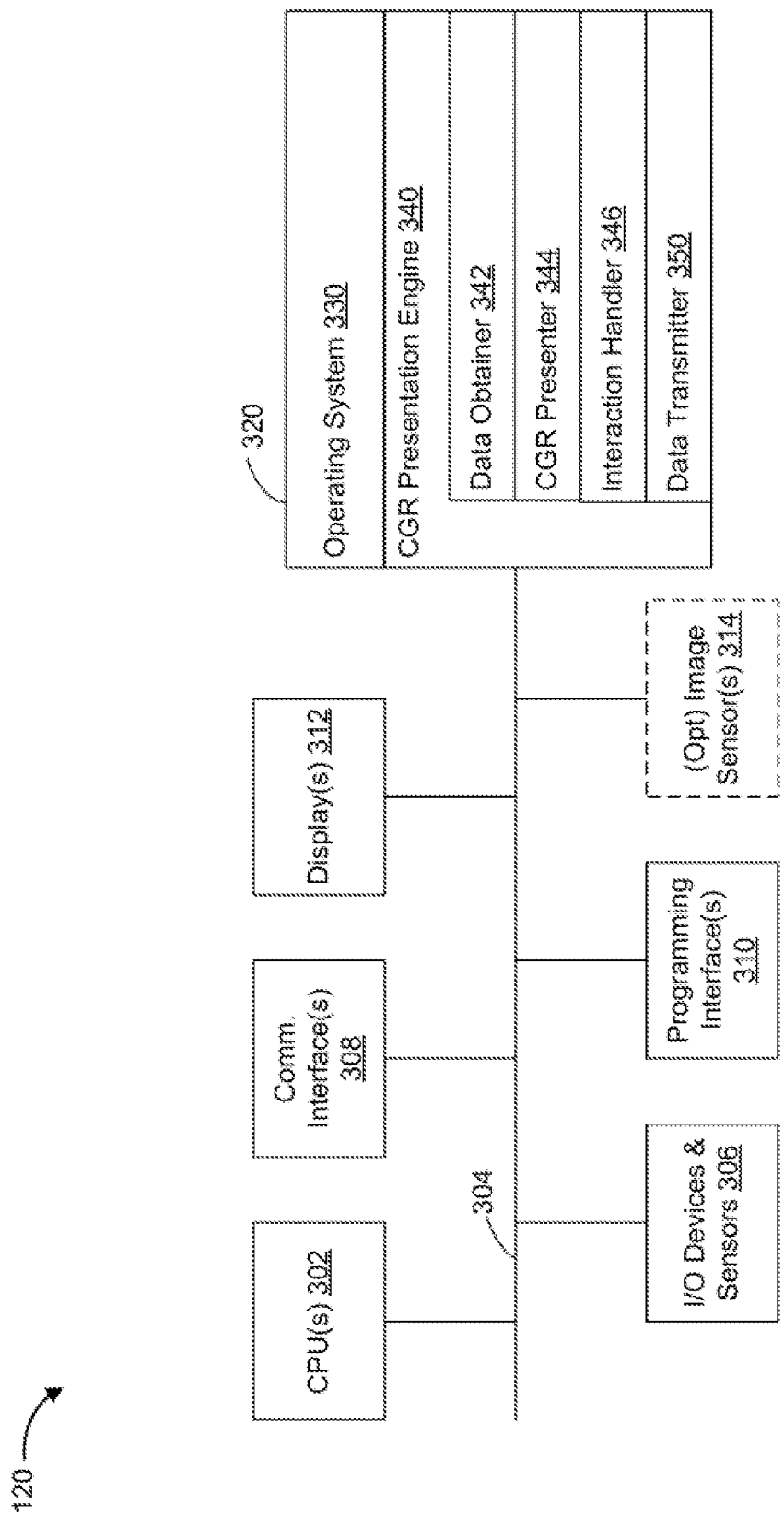
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a head pose tracking engine, a body pose tracking engine, a camera pose tracking engine, and/or the like.

In some implementations, the one or more displays 312 are configured to present the CGR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touch-screen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks. In some implementations, the CGR presentation engine 340 is configured to present CGR content to the user via the one or more displays 312. To that end, in various implementations, the CGR presentation engine 340 includes a data obtainer 342, a CGR presenter 344, an interaction handler 346, and a data transmitter 350.

In some implementations, the data obtainer 342 is configured to obtain data (e.g., presentation data such as rendered image frames associated with the CGR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the CGR presenter 344 is configured to present and update CGR content (e.g., the rendered image frames associated with the CGR environment) via the one or more displays 312. To that end, in various implementations, the CGR presenter 344 includes instructions and/or logic therefor, and heuristics and metadata therefor.

In some implementations, the interaction handler 346 is configured to detect user interactions with the presented CGR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the CGR presenter 344, the interaction handler 346, and the data transmitter 350 are shown as residing on a single device (e.g., the electronic device 120), it should be understood that in other implementations, any combination of the data obtainer 342, the CGR presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 is a block diagram of an example multi-user CGR experience 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 4, a first user associated with an electronic device 420A, a second user associated with an electronic device 420B, and a third user associated with an electronic device 420C participate in the multi-user CGR experience 400. According to some implementations the electronic devices 420A, 420B, and 420C are similar to and adapted from the electronic device 120 shown in FIGS. 1 and 3.

As shown in FIG. 4, the electronic device 420A presents a first perspective 410A of the CGR environment 405 to a first user of the multi-user CGR experience 400. For example, the first perspective 410A of the CGR environment 405 includes a second avatar 430B associated with a second user and a third avatar 430C associated with a third user. As further shown in FIG. 4, the electronic device 420B presents a second perspective 410B of the CGR environment 405 to the second user of the multi-user CGR experience 400. For example, the second perspective 410B of the CGR environment 405 includes a first avatar 430A associated with the first user and the third avatar 430C associated with the third user. As further shown in FIG. 4, the electronic device 420A presents a third perspective 410C of the CGR environment 405 to the third user of the multi-user CGR experience 400. For example, the third perspective 410C of the CGR environment 405 includes a second avatar 430B associated with the second user and the first avatar 430A associated with the first user.

As shown in FIG. 4, the controller 110 coordinates the multi-user CGR experience 400 for multiple users by managing different perspectives 410A, 410B, and 410C of the CGR environment 405. To that end, the controller 110 is communicatively coupled with electronic devices 420A, 420B and 420C via wired or wireless communication channels 444A, 444B, and 444C, respectively, (e.g., BLUETOOTH, IEEE 802.11x, IEEE 802.16x, IEEE 802.3x, etc.). One of ordinary skill in the art will appreciate that the controller 110 may coordinate a shared CGR experience for any number of users. As one example, the CGR environment 405 corresponds to a multiplayer gameplay space, a virtual conference space, a multi-user CGR environment, or the like.

As one example involving the first user, according to some implementations, the controller 110 updates the first perspective 410A of the CGR environment 405 based on a change of the body pose and/or the head pose of the first user. According to some implementations, if one of the users manipulates or otherwise modifies CGR objects and/or CGR content within the CGR environment 405, the controller 110 updates the CGR environment 405 and, subsequently, the first perspective 410A, the second perspective 410B, and the perspective 410C of the multi-user CGR experience 400 accordingly. According to some implementations, if a third-party manager of the multi-user CGR experience 400 instantiates, removes, or otherwise modifies CGR objects and/or CGR content within the CGR environment 405, the controller 110 updates the CGR environment 405 and, subsequently, the first perspective 410A, the second perspective 410B, and the perspective 410C of the multi-user CGR experience 400 accordingly.

Figure 5A:
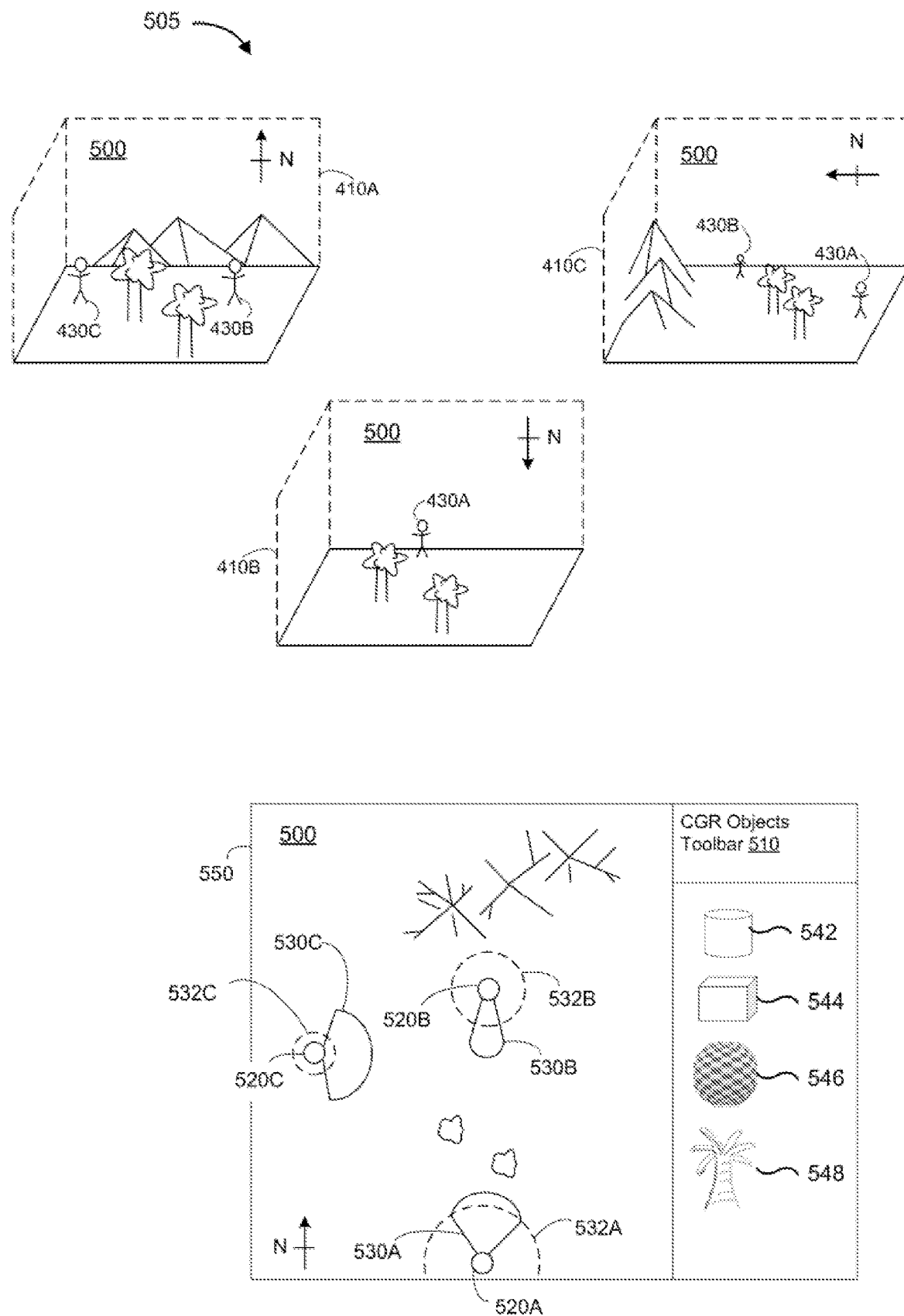

FIGS. 5A-5C illustrate a sequence of instances 505, 515, and 525 for a multi-user CGR experience in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the multi-user CGR experience shown in FIGS. 5A-5C is similar to and adapted from the multi-user CGR experience 400 in FIG. 4. As such, similar references numbers are used in FIGS. 4 and FIGS. 5A-5C and only the differences herein will be described for the sake of brevity.

As shown in FIG. 5A, the instance 505 (e.g., associated with time $T_1$) of the multi-user CGR experience shows the first perspective 410A presented to a first user via the electronic device 420A. The first perspective 410A corresponds to a northward facing view of a CGR environment 500 that includes the second avatar 430B associated with the second user and the third avatar 430C associated with the third user. For example, the CGR environment 500 in FIGS. 5A-5C includes mountains, trees, and the avatars 430A, 430B, and 430C associated with the users.

As shown in FIG. 5A, the instance 505 (e.g., associated with time $T_1$) of the multi-user CGR experience shows the second perspective 410B presented to the second user via the electronic device 420B. The second perspective 410B corresponds to a southward facing view of the CGR environment 500 that includes the first avatar 430A associated with the first user.

As shown in FIG. 5A, the instance 505 (e.g., associated with time $T_1$) of the multi-user CGR experience shows the third perspective 410C presented to the third user via the electronic device 420C. The third perspective 410C corresponds to an eastward facing view of the CGR environment 500 that includes the second avatar 430B associated with the second user and the third avatar 430C associated with the third user.

As shown in FIG. 5A, the instance 505 (e.g., associated with time $T_1$) of the multi-user CGR experience shows a third person view 550 (e.g., a top-down or plan view) of the CGR environment 500 including: (A) a representation 520A of the avatar 430A of the first user accompanied by a representation of a viewing frustum 530A of the first user and a representation of an aural perception region 532A of the first user; (B) a representation 520B of the avatar 430B of the second user accompanied by a representation of a viewing frustum 530B of the second user and a representation of an aural perception region 532B of the second user; and (C) a representation 520C of the avatar 430C of the third user accompanied by a representation of a viewing frustum 530C of the third user and a representation of an aural perception region 532C of the third user. According to some implementations, the representations of the viewing frustums 530A, 530B, and 530C indicate the field-of-views or cones of vision of the users. According to some implementations, the representations of the aural perception regions 532A, 532B, and 532C indicate volumetric spheres that can be audibly perceived by the users.

One of ordinary skill in the art will appreciate that the representations of the viewing frustums 530A, 530B, and 530C may be illustrated in myriad ways. Similarly, one of ordinary skill in the art will appreciate that the representations of the aural perception regions 532A, 532B, and 532C may be illustrated in myriad ways. In some implementations, the third person view 550 is presented to a third-party manager of the multi-user CGR experience. As such, the third-party manager is able to orchestrate or otherwise manage the CGR environment 500 via the third person view 550. According to some implementations, the third person view 550 may also be presented to the users within the CGR environment 500 as a mini-map showing their position in the CGR environment 500 as well as other users within the CGR environment 500. In some implementations, the viewing frustums 530A, 530B, and 530C and the representations of the aural perception regions 532A, 532B, and 532C may be presented to the users within the CGR environment 500 while in a first-person view.

Furthermore, the third person view 550 quickly illustrates where the users are looking within the CGR environment 500 and their associated lines of sight (sometimes also referred to as a "viewing frustum"). According to some implementations, the third-party manager is able to change from the top-down view of the third person view 550 shown in FIGS. 5A-5C to a perspective view and to change the camera pose associated with the perspective view. As a result, one of ordinary skill in the art will appreciate that the representations of the viewing frustums 530A, 530B, and 530C and the representations of the aural perception regions 532A, 532B, and 532C may be illustrated as volumetric, three-dimensional regions in the perspective view.

Generation of the representations of the viewing frustums 530A, 530B, and 530C is described in more detail below with reference to the method 800 in FIG. 8. As shown in FIGS. 5A-5C, the representations of the viewing frustums 530A, 530B, and 530C are different in size and shape. For example, the representation of the viewing frustum 530C is wider than the representation of the viewing frustum 530A. For example, the representation of the viewing frustum 530B is narrower than the representation of the viewing frustum 530A. In some implementations, the third-party manager may be able to modify the viewing frustums of the users such as changing the width of a viewing angle, changing the focal point, zooming, adding a filter to the field-of-view, and/or the like.

Generation of the representations of the aural perception regions 532A, 532B, and 532C is described in more detail below with reference to the method 800 in FIG. 8. As shown in FIGS. 5A-5C, the representations of the aural perception regions 532A, 532B, and 532C are different in size. For example, the representation of the aural perception regions 532C is smaller than the representation of the aural perception regions 532B. In some implementations, the third-party manager may be able to modify the aural perception regions of the users such as changing the radius of the aural perception region, blocking a portion of the aural perception region such as behind or one side of a user, changing an environmental characteristic that causes an overall decrease or increase in the aural perception region, and/or the like.

As shown in FIG. 5A, a CGR objects toolbar 510 is displayed adjacent to the third person view 550. In some implementations, the CGR objects toolbar 510 includes a plurality of representations of CGR objects that may be placed and/or instantiated within the CGR environment 500. For example, the CGR objects toolbar 510 includes a cylinder 542, a cube 544, a sphere 546, and a tree 548. For example, if the third-party manager drags the sphere 546 from the CGR objects toolbar 510 and drops it at a location within the third person view 550, a CGR object associated with the sphere 546 will be instantiated within the CGR environment 500. One of ordinary skill in the art will appreciate that the CGR objects toolbar 510 may include any number of different CGR objects to be placed into the CGR environment. One of ordinary skill in the art will appreciate that CGR objects may be placed into the CGR environment via various other input modalities such as a voice command or the like.

As shown in FIG. 5B, the instance 515 (e.g., associated with time $T_2$) of the multi-user CGR experience shows a drag-and-drop gesture with a touch input 555 from the third-party manager that instantiates a CGR object associated with the cylinder 542 within the CGR environment 500.

As shown in FIG. 5C, the instance 525 (e.g., associated with time $T_3$) of the multi-user CGR experience shows a top-down representation of a cylinder 575 within the third person view 550 of the CGR environment in response to the drag-and-drop gesture in FIG. 5B. Similarly, as shown in FIG. 5C, the first perspective 410A, the second perspective 410B, and the perspective 410C of the CGR environment 500 include a CGR object 585 associated with the cylinder 542 in response to the drag-and-drop gesture in FIG. 5B. As such, as shown by the sequence in FIGS. 5B and 5C, the third-party manager is able to instantiate CGR objects within the CGR environment 500. In some implementations, the third-party manager may be able to modify CGR objects within the CGR environment 500 (e.g., the CGR object 585) such as rotating, translating, scaling, texturizing, coloring, etc.

As shown in FIG. 5C, the CGR object 585 associated with the cylinder 542 is within the field-of-view of the perspectives 410A, 410B, and 410C of the users. However, in other situations, if a CGR object is in the field-of-view of some but not all users, the third-party manager of the multi-user CGR experience may be able to modify the CGR object and/or the field-of-view of the users so that the CGR object is within the field-of-views of all users.

Figure 6A:
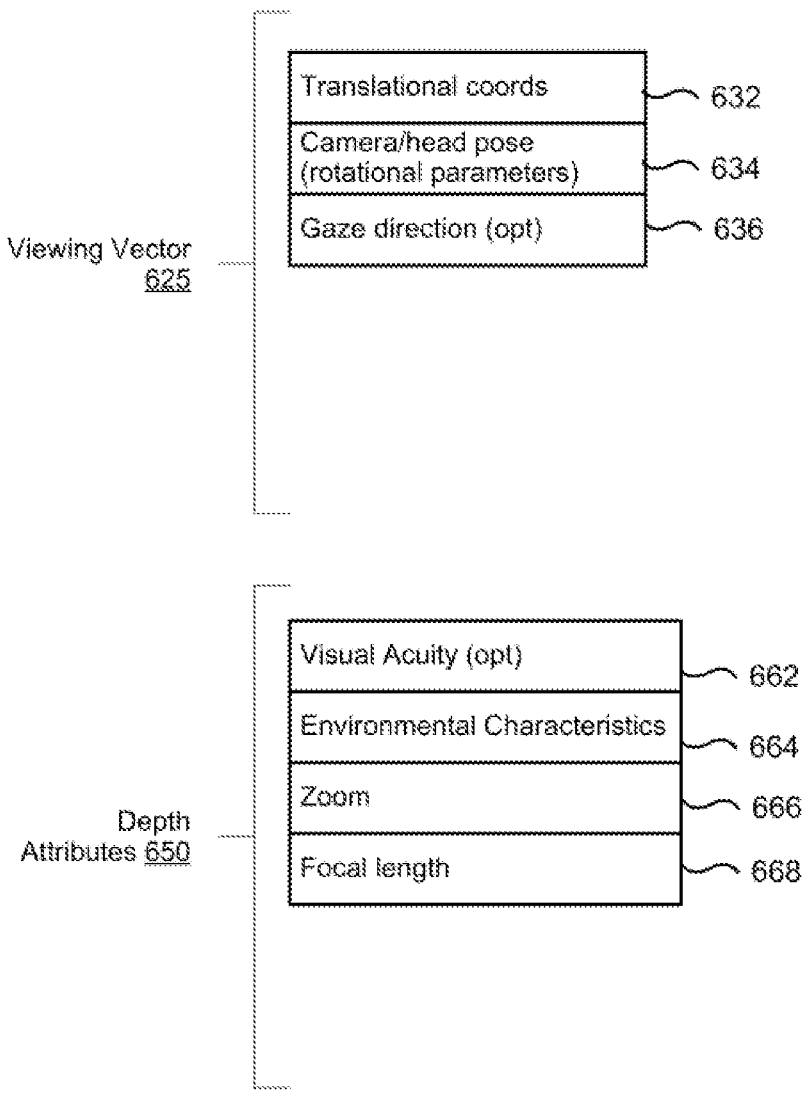
FIG. 6A illustrates block diagrams of example data structures in accordance with some implementations.

FIG. 6A illustrates block diagrams of example data structures in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIG. 6A shows block diagrams of a data structures for a viewing vector 625 and depth attributes 650. For example, the controller 110 or a component thereof (e.g., the viewing frustum manager 250 in FIG. 2) obtains (e.g., receives, retrieves, or generates) the viewing vector 625 and the depth attributes 650 for a respective user associated with a CGR environment based on body pose tracking information, head tracking information, camera pose tracking information, eye tracking information, visual acuity information, intrinsic camera parameters, and/or the like.

According to some implementations, the viewing vector 625 includes: translational coordinates 632 relative to the CGR environment, camera/head pose information 634 (e.g., rotational parameters) associated with the user or camera, and an optional gaze direction 636 (e.g., 2 degrees of freedom associated with eye tracking when a near-eye system is used) associated with the user. As such, for example, the viewing vector 625 may comprises 8 degrees of freedom: x, y, z dimensions associated with the translational coordinates 632; roll, pitch, and yaw dimensions associated with the camera/head pose information 634; and first and second dimensions associated with the gaze direction 636.

According to some implementations, the depth attributes 650 includes: optional visual acuity parameters 662 associated with the user, environmental characteristics 664 associated with the CGR environment, a zoom parameter 666, and a focal length parameter 668. For example, the visual acuity parameters 662 correspond to the spatial resolution or visual perception of a user such as 20/20 or other quantitative vision measurements, near-sightedness, far-sightedness, astigmatism, and/or the like. For example, the environmental characteristics 664 corresponds to characteristics that effect aural and/or visual perception such as fog, smoke, humidity, lighting conditions, and/or the like that have been set for the CGR environment or a reference physical environment associated with the CGR environment. As one example, the environmental characteristics 664 includes one or more lighting measurements for the CGR environment or a reference physical environment associated with the CGR environment. As another example, the environmental characteristics 664 includes one or more acoustic measurements for the CGR environment or a reference physical environment associated with the CGR environment.

For example, the zoom parameter 666 corresponds to a magnification value associated with a field-of-view. For example, the focal length parameter 668 corresponds to a focal length or focal point associated with a field-of-view. In some implementations, the aforenoted parameters are obtained during a calibration process on a user-by-user basis. In some implementations, the aforenoted parameters are obtained manually entered by a user. In some implementations, the aforenoted parameters are obtained over time based on user interaction data. As described above, the controller 110 or a component thereof (e.g., the viewing frustrum manager 250 in FIG. 2) determines a viewing frustum for a user based on the viewing vector 625 and the depth attributes 650.

Figure 6B:
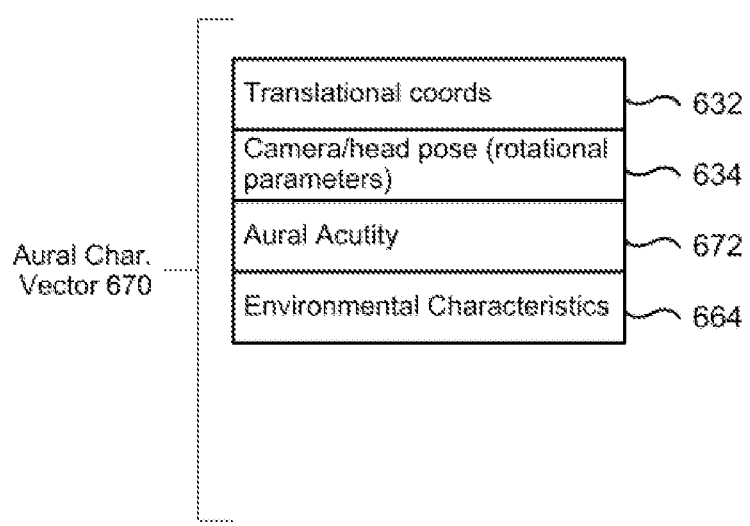
FIG. 6B illustrates a block diagram of an example data structure for an aural characterization vector in accordance with some implementations.

FIG. 6B illustrates a block diagram of an example data structure for an aural characterization vector 670 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. For example, the controller 110 or a component thereof (e.g., the aural perception manager 252 in FIG. 2) obtains (e.g., receives, retrieves, or generates) the aural characterization vector 670 for a respective user associated with a CGR environment based on body pose tracking information, head tracking information, camera pose tracking information, eye tracking information, aural acuity information, and/or the like. The aural characterization vector 670 is similar to and adapted from the viewing vector 625 and the depth attributes 650. As such, common reference numbers are used herein, and the descriptions thereof will not be repeated for the sake of brevity.

For example, the aural acuity parameters 672 correspond to the aural perception of a user such as hearing impairment in one or both ears, inability to hear sounds over a specific frequency, hearing sensitivity for different frequencies at different intensities, and/or the like. In some implementations, the aforenoted parameters are obtained during a calibration process on a user-by-user basis. In some implementations, the aforenoted parameters are obtained manually entered by a user. In some implementations, the aforenoted parameters are obtained over time based on user interaction data. As described above, the controller 110 or a component thereof (e.g., the aural perception manager 252 in FIG. 2) determines an aural perception region for a user based on the aural characterization vector 670.

Figure 7A:
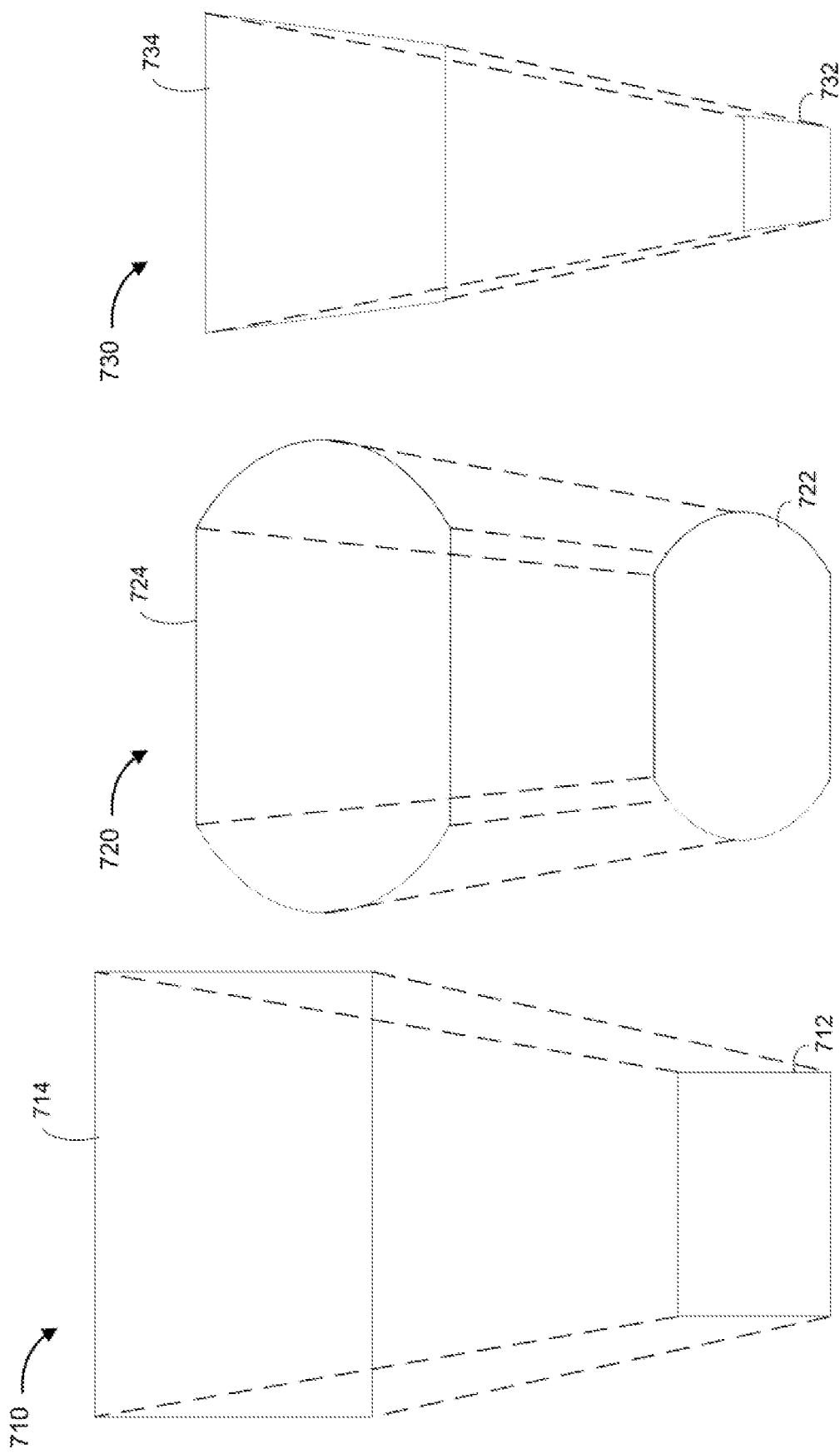
FIG. 7A illustrates example viewing frustums in accordance with some implementations.

FIG. 7A illustrates example viewing frustums 710, 720, and 730 in accordance with some implementations. For example, the viewing frustum 710 includes a near rectangular plane 712 and a far rectangular plane 714. For example, the viewing frustum 720 includes a near elliptical plane 722 and a far elliptical plane 724. For example, the viewing frustum 730 includes a near trapezoidal plane 732 and a far trapezoidal plane 734. One of ordinary skill in the art will appreciate that the viewing frustums may have various shapes, depths, widths, heights, and/or the like.

FIG. 7B illustrates first viewing frustum 740 and a second viewing frustum 750 in accordance with some implementations. For example, the first viewing frustum 740 corresponds to a first state at time $T_1$ with a near elliptical plane 742 and a far elliptical plane 744 separated by a depth 746. Continuing with this example, the third-party manager modifies the viewing frustum by increasing the focal length. In response to the modification by the third-party manager that increases the focal length, the second viewing frustum 750 corresponds to a second state at time $T_2$ with a near elliptical plane 752 and a far elliptical plane 754 separated by a depth 756. As shown in FIG. 7B, the depth 756 is greater than the depth 746 as a result of the modification by the third-party manager that increases the focal length.

FIG. 7C illustrates an example foveated viewing frustum 760 in accordance with some implementations. For example, the viewing frustum 760 includes a near rectangular plane 762A and a far rectangular plane 764A that corresponds to the focal region of the foveated viewing frustum 760. Continuing with this example, the viewing frustum 760 also includes a near concentric rectangular plane 762B and a far concentric rectangular plane 764B that corresponds to the peripheral region of the foveated viewing frustum 760. In some implementations, the focal region of the foveated viewing frustum 760 is presented to a user at a first resolution and the peripheral region of the foveated viewing frustum 760 is presented to the user at a second resolution that is lower than the first resolution. As such, the peripheral region of the foveated viewing frustum 760 is foveated. In some implementations, the foveated viewing frustum 760 is presented to the third-party manager of the multi-user CGR experience 400 in order to illustrate a user's focal and peripheral regions when instantiating CGR objects.

Figure 7D:
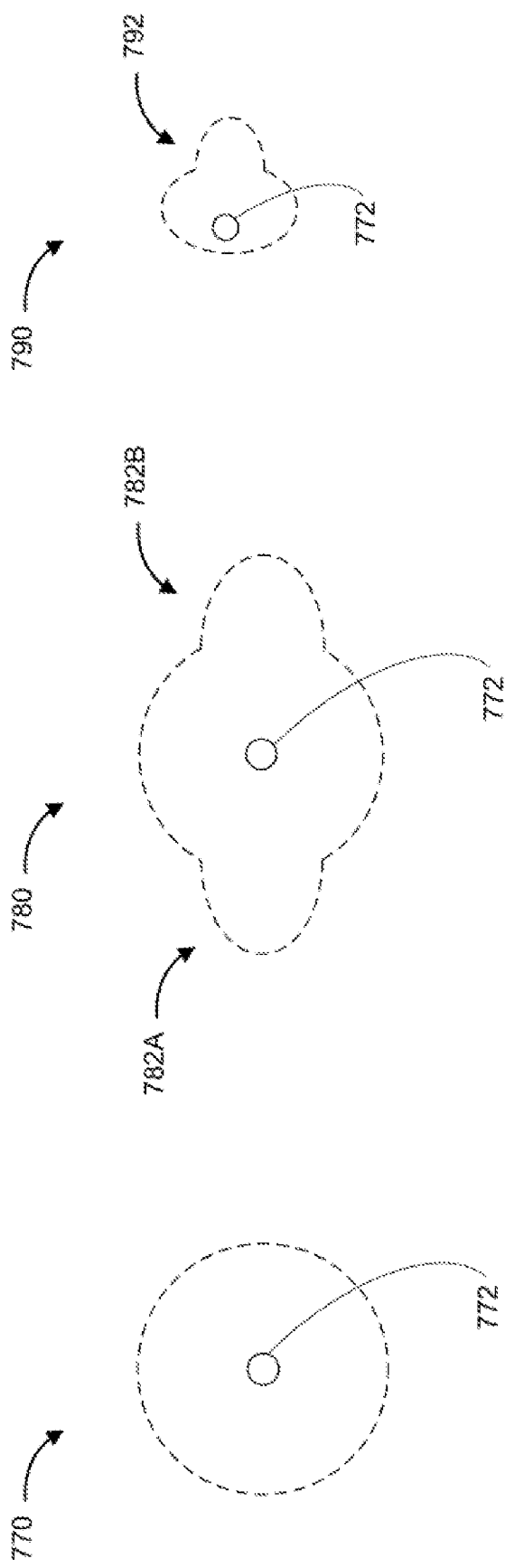
FIG. 7D illustrates example aural perception regions in accordance with some implementations.

FIG. 7D illustrates example aural perception regions 770, 780, and 790 in accordance with some implementations. For example, the aural perception region 770 corresponds to a top-down view of a spherical audible region centered on a first user 772. For example, the aural perception region 780 is similar to the aural perception region 770 but includes peripheral lobes 782A and 782B near the ears of the first user 772. For example, the aural perception region 790 is similar to the aural perception regions 770 and 780 but includes a single lobe 792 on the right side and a truncated left side due to hearing impairment in the left ear of the user 772. One of ordinary skill in the art will appreciate that the aural perception regions may have various shapes, volumes, depths, widths, heights, and/or the like.

Figure 8:
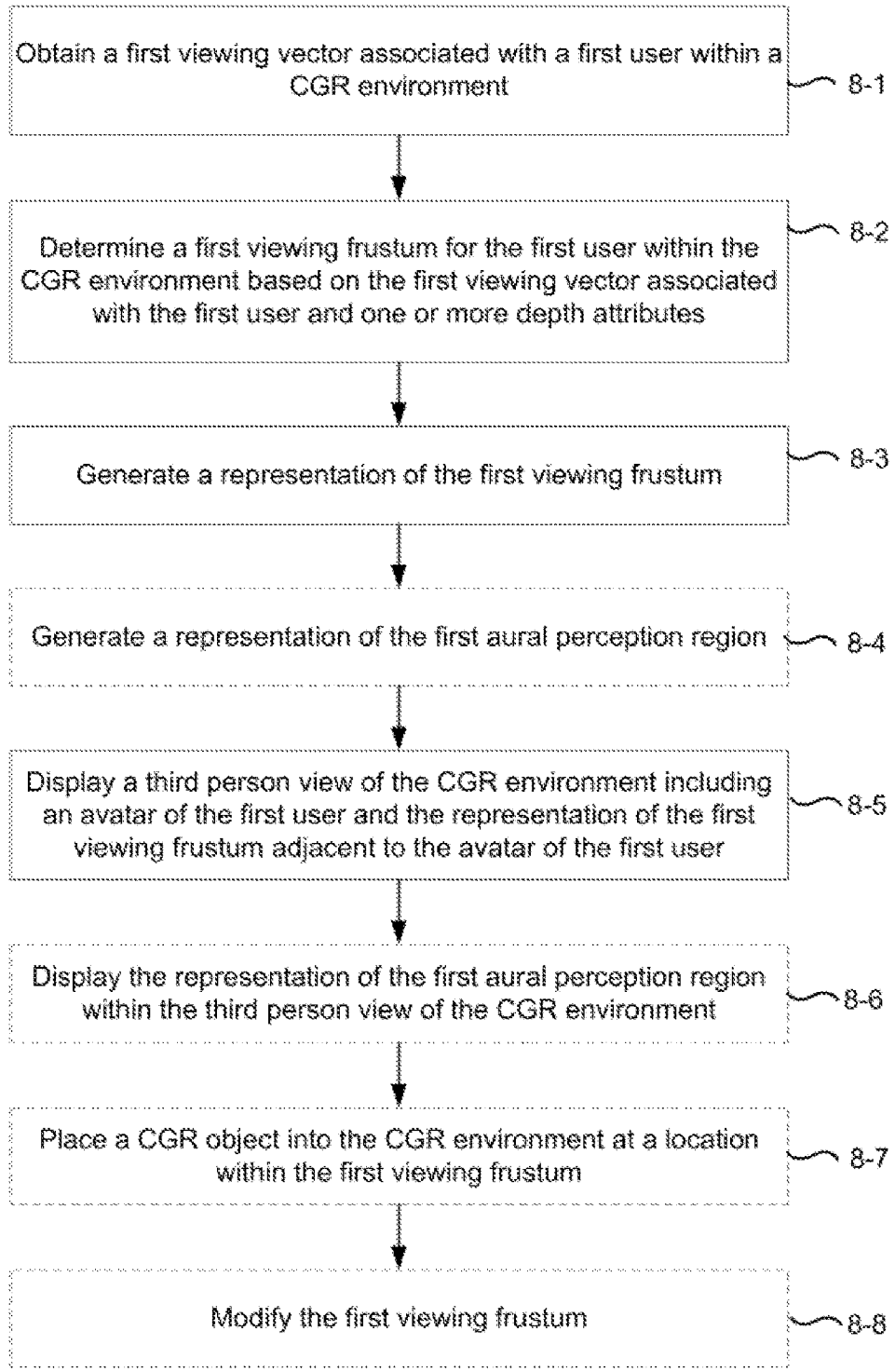
FIG. 8 is a flowchart representation of a method of generating and displaying a third person view of a CGR environment in accordance with some implementations.

FIG. 8 is a flowchart representation of a method 800 of generating and displaying a third person view of a CGR environment in accordance with some implementations. In various implementations, the method 800 is performed by a device with non-transitory memory and one or more processors coupled with the non-transitory memory (e.g., the controller 110 in FIGS. 1 and 2; the electronic device 120 in FIGS. 1 and 3; or a suitable combination thereof), or a component thereof. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As described above, in some instances, an orchestrator (e.g., a puppet-master or third-party manager) of a multi-user experience or a CGR environment, including a plurality of users, may wish to place a CGR object into the field-of-view (FOV) of a subset of the plurality of users. However, the orchestrator, with a third person view (e.g., plan view, top-down view, or the like) of the CGR environment, may not know the bounds of a user's viewing frustum (or cone of vision) in order to place the CGR object into that user's FOV. As such, according to some implementations, the method described herein determines a viewing frustum for each of the plurality of users within the CGR environment and displays representations thereof to the orchestrator. As such, according to some implementations, while displaying an overview of a CGR environment that includes at least one user, an electronic device displays a representation of a viewing frustum (or cone of vision) of the user adjacent to a representation of the user (e.g., a viewing frustum representation emanating from the eyes of the user's avatar).

As represented by block 8-1, the method 800 includes obtaining a first viewing vector associated with a first user within a computer-generated reality (CGR) environment. In some implementations, the device or a component thereof (e.g., the viewing frustum manager 250 in FIG. 2) obtains (e.g., receives, retrieves, or generates) a first viewing vector for a first user within a CGR environment. For example, the first viewing vector characterizes a field-of-view (FOV) of the first user from a set of translational coordinates (relative to a world coordinate system for the CGR environment), wherein the first viewing vector includes a head pose (e.g., rotational coordinates, gaze direction, etc.).

In some implementations, the first viewing vector includes translational coordinates associated with the first user relative to a world coordinate system for the CGR environment, a head pose for the first user, and a gaze direction for the first user. For example, the viewing vector 625 in FIG. 6A shows an example data structure with translational coordinates 632, camera/head pose information 634, and an optional gaze direction 636 for the first user.

Similarly, in some implementations, the device or a component thereof (e.g., the aural perception manager 252 in FIG. 2) obtains (e.g., receives, retrieves, or generates) a first aural characterization vector for the first user within the CGR environment. In some implementations, the first aural characterization vector includes translational coordinates associated with the first user relative to a world coordinate system for the CGR environment, a head pose for the first user, aural acuity parameters associated with the first user, and environmental characteristics associated with the CGR environment. For example, the aural characterization vector 670 in FIG. 6B shows an example data structure with translational coordinates 632, camera/head pose information 634, aural acuity parameters 672 associated with the user, and environmental characteristics 664 associated with the CGR environment.

As represented by block 8-2, the method 800 includes determining a first viewing frustum (e.g., a cone of vision) for the first user within the CGR environment based on the first viewing vector associated with the first user and one or more depth attributes. In some implementations, the device or a component thereof (e.g., the viewing frustum manager 250 in FIG. 2) determines a viewing frustum for the user based on the first viewing vector for the first user and the one or more depth attributes associated with the first user.

In some implementations, the device or a component thereof (e.g., the viewing frustum manager 250 in FIG. 2) obtains (e.g., receives, retrieves, or generates) one or more depth attributes associated with a first user within a CGR environment. For example, the one or more depth attributes characterize the visibility of the first user based on zoom or focal length, environmental characteristics of the CGR environment, such as foggy, smoggy, clear, etc., and the visual acuity of the user such as 20/20 vision, near-sightedness, far-sightedness, etc. In some implementations, the one or more depth attributes correspond to environmental visibility parameters, such as fog, lighting conditions, and/or the like, within the CGR environment. According to some implementations, the depth attributes 650 in FIG. 6A shows an example data structure with optional visual acuity parameters 662, environmental characteristics 664, a zoom parameter 666, and a focal length parameter 668.

Similarly, in some implementations, the device or a component thereof (e.g., the aural perception manager 252 in FIG. 2) determines a first aural perception region for the first user based on the aural characterization vector associated with the first user.

As represented by block 8-3, the method 800 includes generating a representation of the first viewing frustum. In some implementations, the device or a component thereof (e.g., the perception visualizer 254 in FIG. 2) generates a representation of the first viewing frustum. In some implementations, the representation of the first viewing frustum corresponds to a volumetric region such as a cone or a prism. FIG. 7A shows example viewing frustums 710, 720, and 730 in accordance with some implementations. One of ordinary skill in the art will appreciate that the viewing frustums may have various shapes, depths, widths, heights, and/or the like.

According to some implementations, as represented by block 8-4, the method 800 includes generating a representation of the first aural perception region. In some implementations, the device or a component thereof (e.g., the perception visualizer 254 in FIG. 2) generates a representation of the first aural perception region. In some implementations, the representation of the first aural perception region corresponds to a volumetric region such as a sphere. FIG. 7D shows example aural perception regions 770, 780, and 790 in accordance with some implementations. One of ordinary skill in the art will appreciate that the aural perception regions may have various shapes, volumes, depths, widths, heights, and/or the like.

As represented by block 8-5, the method 800 includes displaying, via the display device, a third person view of the CGR environment (e.g., a plan, top-down, or perspective view) including an avatar of the first user and the representation of the first viewing frustum adjacent to the avatar of the first user. In some implementations, the device or a component thereof (e.g., third person view engine 256 in FIG. 2) generates a third person view of the CGR environment that at least includes an avatar for the user and the representation of the viewing frustum adjacent to the avatar of the user. In some implementations, the device or a component thereof (e.g., third person view engine 256 in FIG. 2) presents the third person view of the CGR environment to an orchestrator (e.g., a puppet-master or third-party manager) of a CGR environment or a multi-user CGR experience. According to some implementations, within reference to FIGS. 5A-5C, the third person view 550 may also be presented to the users within the CGR environment 500 as a mini-map showing their position and perception regions within the CGR environment 500 as well as the positions and perception regions of other users within the CGR environment 500.

According to some implementations, as represented by block 8-6, the method 800 includes displaying the representation of the first aural perception region within the third person view of the CGR environment. In some implementations, the device or a component thereof (e.g., third person view engine 256 in FIG. 2) presents the representation of the aural perception region adjacent to the avatar of the user within the third person view of the CGR environment. In some implementations, the viewing frustums 530A, 530B, and 530C and the representations of the aural perception regions 532A, 532B, and 532C may be presented to the users within the CGR environment 500 while in a first-person view.

FIGS. 5A-5C show a third person view 550 (e.g., a top-down or plan view) of the CGR environment 500 including: (A) a representation 520A of the avatar 430A of the first user accompanied by a representation of a viewing frustum 530A of the first user and a representation of an aural perception region 532A of the first user; (B) a representation 520B of the avatar 430B of the second user accompanied by a representation of a viewing frustum 530B of the second user and a representation of an aural perception region 532B of the second user; and (C) a representation 520C of the avatar 430C of the third user accompanied by a representation of a viewing frustum 530C of the third user and a representation of an aural perception region 532C of the third user. According to some implementations, the representations of the viewing frustums 530A, 530B, and 530C indicate the field-of-views or cones of vision of the users. According to some implementations, the representations of the aural perception regions 532A, 532B, and 532C indicate volumetric spheres that can be audibly perceived by the users.

In some implementations, the representation of the first viewing frustum is displayed according to a first set of visual characteristics and the representation of the first aural perception region is displayed according to a second set of visual characteristics. For example, the first set of visual characteristics corresponds to a first color, texture, shade, and/or the like, and the second set of visual characteristics corresponds to a second color, texture, shade, and/or the like. In some implementations, the first and second sets of visual characteristics are mutually exclusive and/or visually distinct.

In some implementations, the third person view of the CGR environment further includes a plurality of avatars of for a plurality of users within the CGR environment and representations of viewing frustums adjacent to the plurality of avatars. For example, the orchestrator is able to adjust a viewing frustum of user(s) so multiple users can see a CGR object where the multiple users could not initially see the CGR object. For example, the orchestrator is able to adjust the scale or size of a CGR object so multiple users can see the CGR object where the multiple users could not initially see the CGR object.

In some implementations, as represented by block 8-7, the method 800 includes placing a CGR object into the CGR environment at a location within the first viewing frustum. As such, in other words, the method 800 includes: detecting a user input that corresponds to placing a CGR object within the first viewing frustum of the first user; and in response to detecting the user input, displaying the CGR object within the CGR environment, wherein a location of the CGR object is within the first viewing frustum of the first user. FIGS. 5B and 5C show a sequence in which the orchestrator instantiates CGR object 585 within the CGR environment 500 based on a drag-and-drop gesture within the third person view 550 of the CGR environment 500. In some implementations, the CGR object may subsequently be modified by a user within the CGR environment or by the orchestrator.

In some implementations, as represented by block 8-8, the method 800 includes modifying the first viewing frustum. As such, in other words, the method 800 includes: detecting a user input that corresponds to modifying the first viewing frustum for the first user; and in response to detecting the user input, modifying the first viewing frustum for the first user. In some implementations, the user input also causes the field-of-view of the first user to change such as a zoom in/out, a focal length change, a visuality acuity change, and/or the like.

Similarly, in some implementations, the method 800 includes modifying the first aural perception region. As such, in other words, the method 800 includes: detecting a user input that corresponds to modifying the first aural perception region for the first user; and in response to detecting the user input, modifying the first aural perception region for the first user.

In some implementations, the method 800 includes: determining a focal region of the first user within the first viewing frustum; and determining a peripheral region of the first user within the first viewing frustum. In some implementations, generating the representation of the first viewing frustum includes disambiguating the focal region and the peripheral region of the first user by associating the focal region with a first appearance and the peripheral region with a second appearance. In accordance with some implementations, FIG. 7C shows an example foveated viewing frustum 760 with a focal region and a peripheral region. For example, the third person view may show the foveated viewing frustum adjacent to an avatar in order to illustrate the focal and peripheral portions of a user's field-of-view.

In some implementations, the method 800 includes: causing CGR objects within the focal region of the first user to be displayed with a first quality; causing CGR objects within the peripheral region of the first user to be displayed with a second quality; and causing CGR objects outside of the first viewing frustum of the first user to be displayed with a third quality. In some implementations, the electronic device (e.g., the controller 110 in FIG. 4) controls the rendering/display quality of perspectives presented to the users within the CGR environment (e.g., the electronic devices 420A, 420B, and 420C in FIG. 4). In some implementations, the user (e.g., the orchestrator) of the electronic device (e.g., the controller 110 in FIG. 4) is able to control the rendering/display quality of perspectives presented to the users within the CGR environment (e.g., the electronic devices 420A, 420B, and 420C in FIG. 4).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device and one or more input devices:
      obtaining first information characterizing a first sensory perception modality for a first user at a first location within a computer-generated reality (CGR) environment;
      obtaining second information characterizing a second sensory perception modality different from the first sensory perception modality for the first user relative at the first location within the CGR environment;
      generating a first visual representation associated with the first sensory perception modality based on the first information characterizing the first sensory perception modality for the first user within the CGR environment;
      generating a second visual representation associated with the second sensory perception modality based on the second information characterizing the second sensory perception modality for the first user within the CGR environment; and
      displaying, via the display device, at least a portion of the CGR environment including a representation of the first user at the first location within the CGR environment and the first visual representation and the second visual representation relative to the first location within the CGR environment.

2. The method of claim 1, wherein the first sensory perception modality corresponds to a visual perception modality for the first user, and wherein the second sensory perception modality corresponds to an aural perception modality for the first user.

3. The method of claim 1, wherein the portion of the CGR environment of the CGR environment further includes a plurality of avatars of a plurality of users within the CGR environment including an avatar for the first user.

4. The method of claim 1, wherein the first visual representation corresponds to a first volumetric region, and wherein the second visual representation to a second volumetric region different from the first volumetric region.

5. The method of claim 1, further comprising:
   detecting a user input that corresponds to placing a CGR object within the first visual representation of the first user; and
   in response to detecting the user input, displaying the CGR object within the CGR environment, wherein a location of the CGR object is within the first visual representation of the first user.

6. The method of claim 1, further comprising:
   detecting a user input that corresponds to modifying the first sensory perception modality for the first user; and
   in response to detecting the user input, modifying the first visual representation for the first user.

7. The method of claim 1, further comprising:
   determining a focal region of the first user relative to the first visual representation;
   determining a peripheral region of the first user relative to the first visual representation; and
   wherein generating the first visual representation includes disambiguating the focal region and the peripheral region of the first user by associating the focal region with a first appearance and the peripheral region with a second appearance.

8. The method of claim 7, further comprising:
   causing CGR objects within the focal region of the first user to be displayed with a first quality;
   causing CGR objects within the peripheral region of the first user to be displayed with a second quality; and
   causing CGR objects outside of a first viewing frustum of the first user to be displayed with a third quality.

9. A device comprising:
   one or more processors;
   a non-transitory memory;
   an interface for communicating with a display device and one or more input devices; and one or more programs stored in the non-transitory memory, which, when executed by the one or more processors, cause the device to:
  obtain first information characterizing a first sensory perception modality for a first user at a first location within a computer-generated reality (CGR) environment;
  obtain second information characterizing a second sensory perception modality different from the first sensory perception modality for the first user relative at the first location within the CGR environment;
  generate a first visual representation associated with the first sensory perception modality based on the first information characterizing the first sensory perception modality for the first user within the CGR environment;
  generate a second visual representation associated with the second sensory perception modality based on the second information characterizing the second sensory perception modality for the first user within the CGR environment; and
  display, via the display device, at least a portion of the CGR environment including a representation of the first user at the first location within the CGR environment and the first visual representation and the second visual representation relative to the first location within the CGR environment.

10. The device of claim 9, wherein the first sensory perception modality corresponds to a visual perception modality for the first user, and wherein the second sensory perception modality corresponds to an aural perception modality for the first user.

11. The device of claim 9, wherein the portion of the CGR environment further includes a plurality of avatars of a plurality of users within the CGR environment including an avatar for the first user.

12. The device of claim 9, wherein the first visual representation corresponds to a first volumetric region, and wherein the second visual representation to a second volumetric region different from the first volumetric region.

13. A non-transitory memory storing one or more programs, which, when executed by one or more processors of a device with an interface for communicating with a display device and one or more input devices, cause the device to:
  obtain first information characterizing a first sensory perception modality for a first user at a first location within a computer-generated reality (CGR) environment;
  obtain second information characterizing a second sensory perception modality different from the first sensory perception modality for the first user relative at the first location within the CGR environment;
  generate a first visual representation associated with the first sensory perception modality based on the first information characterizing the first sensory perception modality for the first user within the CGR environment;
  generate a second visual representation associated with the second sensory perception modality based on the second information characterizing the second sensory perception modality for the first user within the CGR environment; and
  display, via the display device, at least a portion of the CGR environment including a representation of the first user at the first location within the CGR environment and the first visual representation and the second visual representation relative to the first location within the CGR environment.

14. The non-transitory memory of claim 13, wherein the first sensory perception modality corresponds to a visual perception modality for the first user, and wherein the second sensory perception modality corresponds to an aural perception modality for the first user.

15. The non-transitory memory of claim 13, wherein the portion of the CGR environment of the CGR environment further includes a plurality of avatars of a plurality of users within the CGR environment including an avatar for the first user.

16. The non-transitory memory of claim 13, wherein the first visual representation corresponds to a first volumetric region, and wherein the second visual representation to a second volumetric region different from the first volumetric region.

17. The non-transitory memory of claim 13, wherein the one or more programs further cause the device to:
  detect a user input that corresponds to placing a CGR object within the first visual representation of the first user; and
  in response to detecting the user input, display the CGR object within the CGR environment, wherein a location of the CGR object is within the first visual representation of the first user.

18. The non-transitory memory of claim 13, wherein the one or more programs further cause the device to:
  detect a user input that corresponds to modifying the first sensory perception modality for the first user; and
  in response to detecting the user input, modify the first visual representation for the first user.

19. The non-transitory memory of claim 13, wherein the one or more programs further cause the device to:
  determine a focal region of the first user relative to the first visual representation;
  determine a peripheral region of the first user relative to the first visual representation; and
  wherein generating the first visual representation includes disambiguating the focal region and the peripheral region of the first user by associating the focal region with a first appearance and the peripheral region with a second appearance.

20. The non-transitory memory of claim 19, wherein the one or more programs further cause the device to:
  cause CGR objects within the focal region of the first user to be displayed with a first quality;
  cause CGR objects within the peripheral region of the first user to be displayed with a second quality; and
  cause CGR objects outside of a first viewing frustum of the first user to be displayed with a third quality.

* * * * *